United States Patent
Kim et al.

(10) Patent No.: US 9,823,472 B2
(45) Date of Patent: Nov. 21, 2017

(54) HEAD UP DISPLAY FOR VEHICLE

(71) Applicant: LG ELECTRONICS INC., Seoul (KR)

(72) Inventors: Youngjin Kim, Seoul (KR); Juhyeok Ryu, Seoul (KR); Dongwook Kim, Seoul (KR); Kyoungil Lee, Seoul (KR); Seunggyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/212,847

(22) Filed: Jul. 18, 2016

(65) Prior Publication Data

US 2017/0045738 A1    Feb. 16, 2017

Related U.S. Application Data

(60) Provisional application No. 62/340,503, filed on May 23, 2016, provisional application No. 62/294,303, filed on Feb. 12, 2016.

(30) Foreign Application Priority Data

Jul. 17, 2015   (KR) .......................... 10-2015-0101540
Jun. 24, 2016   (KR) .......................... 10-2016-0079035

(51) Int. Cl.
  *G02B 27/01*    (2006.01)
  *B60K 35/00*    (2006.01)
  *G02B 5/30*     (2006.01)

(52) U.S. Cl.
  CPC .......... *G02B 27/0101* (2013.01); *B60K 35/00* (2013.01); *G02B 5/30* (2013.01);
  (Continued)

(58) Field of Classification Search
  CPC .......... G02B 27/0101; G02B 2027/015; G02B 2027/0161; G02B 2027/0196;
  (Continued)

(56) References Cited

U.S. PATENT DOCUMENTS 3,547,522 A * 12/1970 Schaefer ............ G02B 27/0101
                                                      348/115
5,013,135 A     5/1991  Yamamura
(Continued)

FOREIGN PATENT DOCUMENTS

EP      0 566 004 A2    10/1993
JP      2008-70504 A    3/2008
(Continued)

*Primary Examiner* — Frank Font
(74) *Attorney, Agent, or Firm* — Birch, Stewart, Kolasch & Birch, LLP

(57) ABSTRACT

A head up display for a vehicle, the head up display including a display panel configured to emit image light; a polarized light plate configured to linearly polarize the image light emitted from the display panel; a reflection mirror configured to reflect the image light to a windshield of the vehicle; a phase retardance mirror spaced apart from the reflection mirror to reflect the image light forward while converting a phase of the image light, wherein the phase retardance mirror includes a rear mirror and a phase retarder disposed on a front surface of the rear mirror; and a polarization reflection mirror disposed between the reflection mirror and the phase retardance mirror and configured to reflect the image light passing through the polarized light plate to the phase retardance mirror, wherein the image light reflected to the phase retardance mirror is converted in phase by the phase retardance mirror and reflected by the phase retardance mirror to pass through the polarization reflection mirror.

20 Claims, 11 Drawing Sheets

(52) U.S. Cl.
CPC ............... *B60K 2350/1068* (2013.01); *B60K 2350/2052* (2013.01); *B60K 2350/2095* (2013.01); *G02B 2027/0118* (2013.01)

(58) Field of Classification Search
CPC ........... B60K 35/00; B60K 2350/1072; B60K 2350/203; B60K 2350/2052; B60K 2350/2095; B60K 2350/965
USPC ..... 359/485.07, 489.07, 631, 633, 850, 853, 359/871
See application file for complete search history.

(56) References Cited

U.S. PATENT DOCUMENTS

| | | | |
|---|---|---|---|
| 5,119,236 A * | 6/1992 | Fong | B64D 41/00 |
| | | | 359/630 |
| 5,896,231 A * | 4/1999 | Oikawa | B60K 35/00 |
| | | | 116/304 |
| 6,853,413 B2 | 2/2005 | Larson | |
| 2002/0021387 A1 | 2/2002 | Larson | |
| 2008/0174735 A1* | 7/2008 | Quach | G02B 5/32 |
| | | | 353/15 |
| 2013/0279016 A1 | 10/2013 | Finger | |
| 2015/0177563 A1 | 6/2015 | Cho et al. | |
| 2017/0146803 A1* | 5/2017 | Kishigami | G02B 27/0179 |

FOREIGN PATENT DOCUMENTS

| | | |
|---|---|---|
| KR | 10-1995-0024002 A | 8/1995 |
| KR | 2003-0013385 A | 2/2003 |
| KR | 10-2008-0044040 A | 5/2008 |
| KR | 10-1017032 B1 | 2/2011 |
| KR | 10-2014-0031173 A | 3/2014 |
| KR | 10-2015-0073695 A | 7/2015 |
| WO | WO 00/67064 A1 | 11/2000 |

* cited by examiner

HEAD UP DISPLAY FOR VEHICLE

CROSS-REFERENCE TO RELATED APPLICATIONS

The present application claims the benefit of priority under 35 U.S.C. §119 to Korean Patent Application Nos. 10-2015-0101540, filed on Jul. 17, 2015, and 10-2016-0079035, filed on Jun. 24, 2016, and under 35 U.S.C. §119 to U.S. Patent Provisional Application Nos. 62/340,503, filed on May 23, 2016, and 62/294,303, filed on Feb. 12, 2016, all of which are hereby incorporated by reference in their entirety.

BACKGROUND OF THE INVENTION

Field of the Invention

The present disclosure relates to a head up display for a vehicle, and more particularly, a head up display for a vehicle, which emits image light upward.

Discussion of the Background

A head up display for a vehicle emits an image to a windshield of the vehicle. For example, the head up display can display various information including driving information while the driver is driving the vehicle.

In more detail, the head up display includes a display panel generating and outputting image light and at least one mirror reflecting the image light generated by the display panel. The image light generated by the display panel is incident into the windshield of the vehicle by the mirror, and thus the driver can recognize a virtual image in the front of the windshield.

SUMMARY OF THE INVENTION

One aspect of the present invention is to provide a compact head up display for a vehicle, which minimizes a front and rear width while minimizing the number of components.

To achieve these and other advantages and in accordance with the purpose of the present invention, as embodied and broadly described herein, the present invention provides in one aspect a head up display for a vehicle, the head up display including a display panel configured to emit image light; a polarized light plate configured to linearly polarize the image light emitted from the display panel; a reflection mirror configured to reflect the image light to a windshield of the vehicle; a phase retardance mirror spaced apart from the reflection mirror to reflect the image light forward while converting a phase of the image light, wherein the phase retardance mirror includes a rear mirror and a phase retarder disposed on a front surface of the rear mirror; and a polarization reflection mirror disposed between the reflection mirror and the phase retardance mirror and configured to reflect the image light passing through the polarized light plate to the phase retardance mirror, wherein the image light reflected to the phase retardance mirror is converted in phase by the phase retardance mirror and reflected by the phase retardance mirror to pass through the polarization reflection mirror.

In another aspect, the present invention provides a head up display for a vehicle, the head up display including a main body having an inner space; a display panel configured to emit image light; a polarized light plate configured to linearly polarize the image light emitted from the display panel; a reflection mirror disposed in the inner space and configured to reflect the image light to a windshield of the vehicle; and a mirror assembly spaced apart from the reflection mirror in the inner space. The mirror assembly includes a holder; a phase retardance mirror spaced apart from the reflection mirror on the holder, and configured to convert the image light incident from a front side thereof to reflect the converted image line forward, wherein the phase retardance mirror includes a rear mirror and a phase retarder disposed on a front surface of the rear mirror; and a polarization reflection mirror disposed on the holder between the reflection mirror and the phase retardance mirror and configured to reflect the image light passing through the polarized light plate to the phase retardance mirror, wherein the image light reflected to the phase retardance mirror is converted in phase by the phase retardance mirror and reflected by the phase retardance mirror to pass through the polarization reflection mirror.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Reference will now be made in detail to the embodiments of the present disclosure, examples of which are illustrated in the accompanying drawings.

Figure 1:
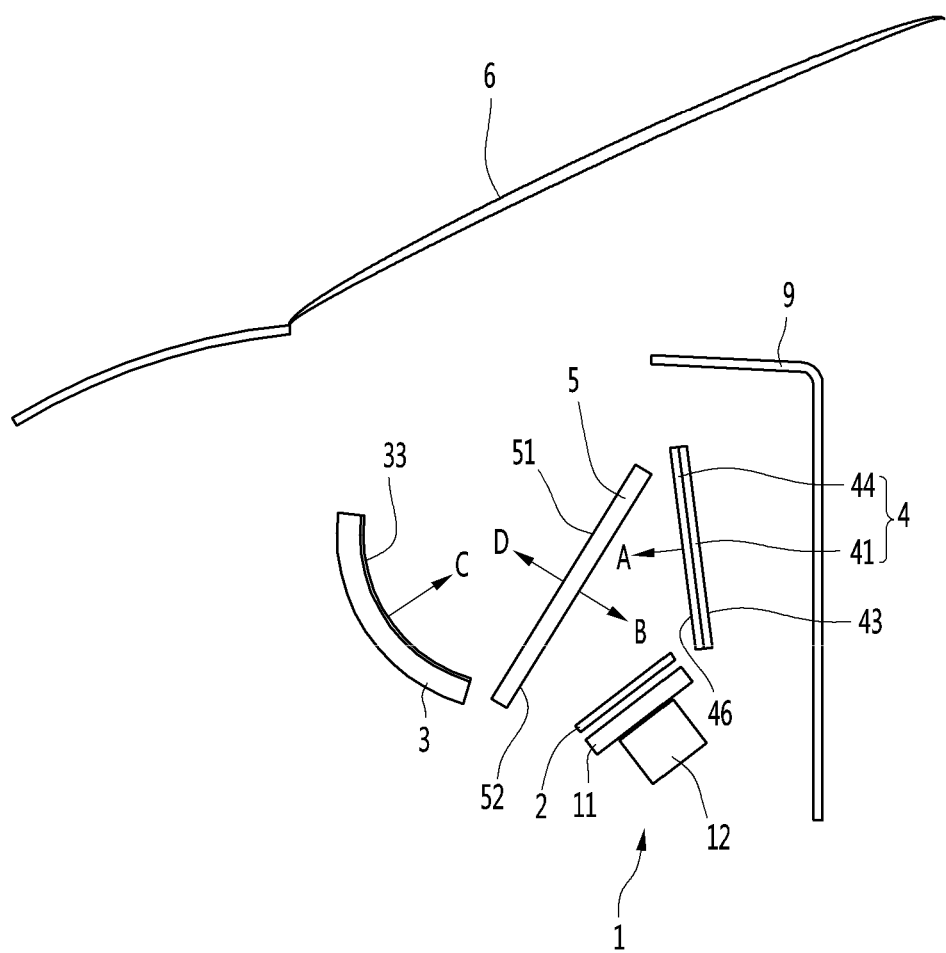
FIG. 1 is a side view illustrating main components of a head up display for a vehicle according to an embodiment.
Figure 2:
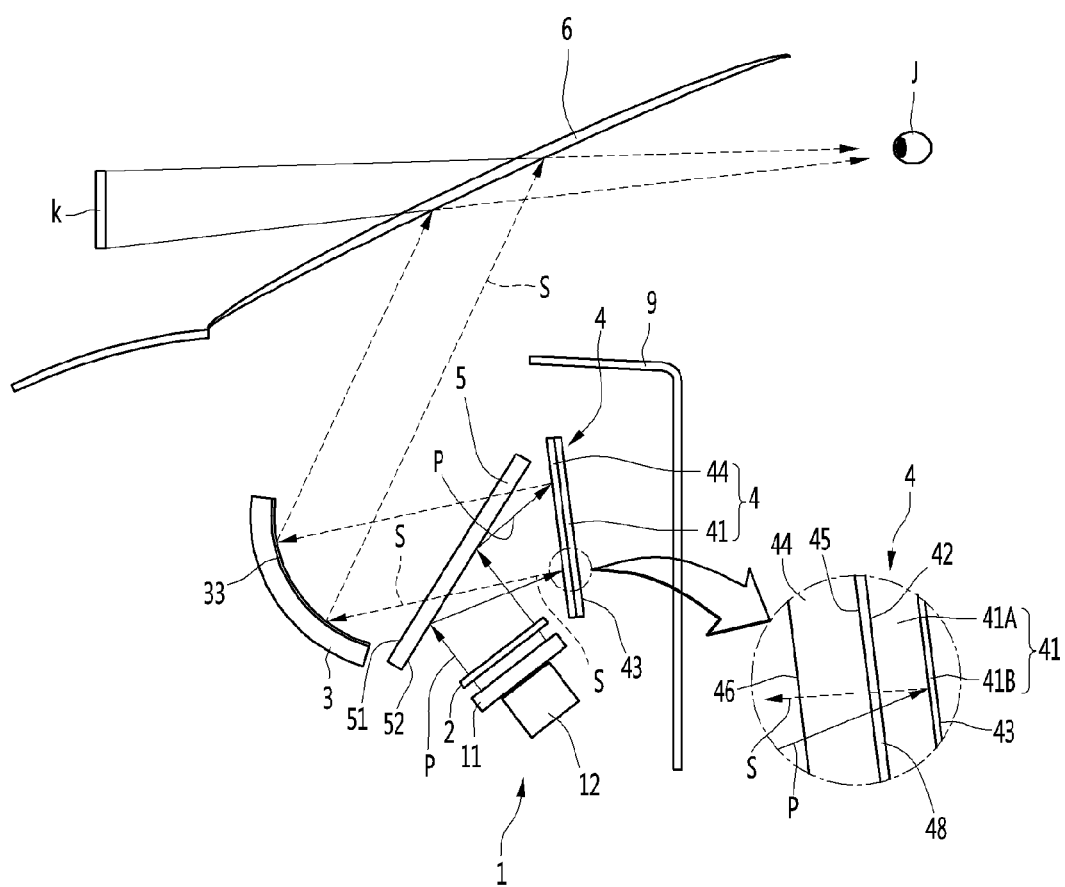
FIG. 2 is a side view illustrating an image path of the head up display for the vehicle according to an embodiment.
Figure 3:
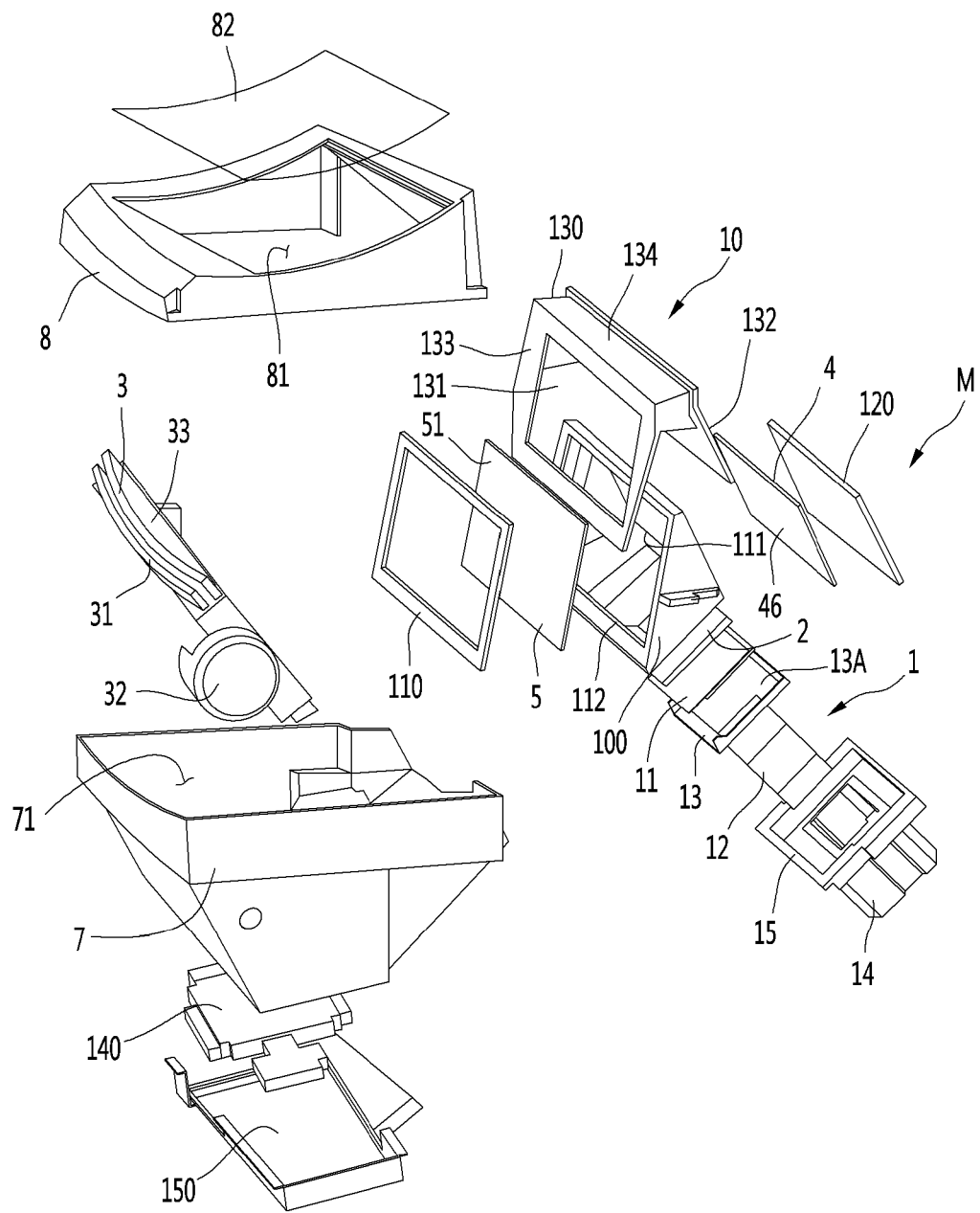
FIG. 3 is an exploded perspective view of the head up display for the vehicle according to an embodiment.
Figure 4:
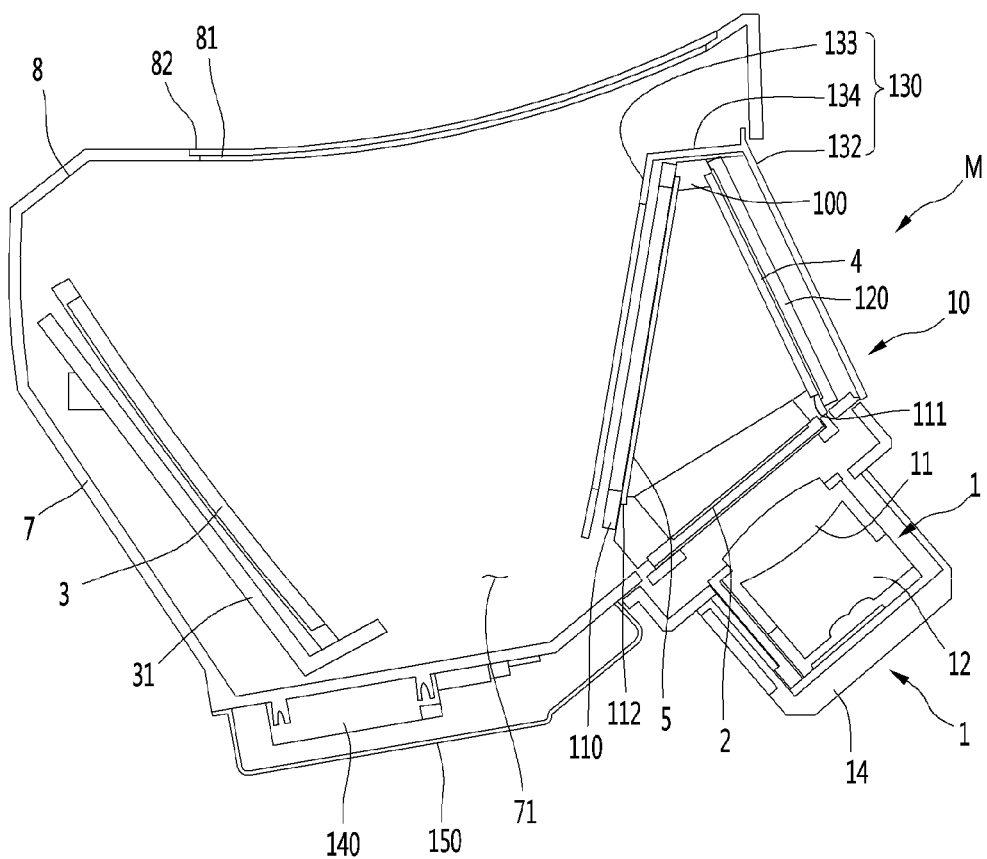
FIG. 4 is a cross-sectional view of the head up display for the vehicle according to an embodiment.

FIG. 1 is a side view illustrating main components of a head up display for a vehicle, FIG. 2 is a side view illustrating an image path of the head up display, FIG. 3 is an exploded perspective view of the head up display, and FIG. 4 is a cross-sectional view of the head up display for the vehicle according to an embodiment.

As shown, the head up display for the vehicle according to an embodiment includes a display panel 1, a polarized light plate 2, a reflection mirror 3, a phase retardance mirror 4, and a polarization reflection mirror 5. The head up display emits image light to a windshield 6 of the vehicle and can be accommodated into an instrument panel 9 disposed at a front side of a driver's seat or be placed on the instrument panel 9 to emit the image light upward.

Further, the display panel 1 emits the image light to the polarized light plate 2, and can be an image generation unit, i.e., display equipment that is capable of controlling an electrical signal to generate image light, such as a liquid crystal display (LCD) panel, a light emitting diode panel, and an organic light emitting diode panel.

The display panel 1 also includes a display device 11 and a light source 12 emitting light to the display device 11. As shown in FIG. 3, the display panel 11 includes a display cover 13 surrounding an edge of the display device 11. A light transmission hole 13A through which light emitted from the light source 12 is transmitted is also defined in the display cover 13.

The light source 12 may be a backlight unit (BLU) emitting light to the display device 11. Further, an LED, an OLED, and the like may be used as the light source 12. When the light source 12 is turned on, heat is generated from the light source 12 and thus a heat dissipation device 14 for releasing the heat generated from the light source 12 can contact the light source 12.

In more detail, the heat dissipation device 14 may be a heatsink that releases the heat generated from the display panel 1 and be mounted on a main body 7 that will be described later. The heat dissipation device 14 can also be mounted to protrude outward from the main body 7.

Further, a display panel accommodation part 15 for accommodating the display panel 1 can be provided in the heat dissipation device 14. Thus, the display panel 1 can be accommodated into the display panel accommodation part 15 and be disposed between the heat dissipation device 14 and the polarized light plate 2 to emit the image light to the polarized light plate 2.

In addition, the polarized light plate 2 can linearly polarize the image light emitted from the display panel 1. For example, the polarized light plate 2 can include a linear polarizer that linearly polarizes the image light in one direction. That is, non-polarized light is generally emitted from the display panel 1 a and thus the non-polarized light emitted from the display panel 1 is polarized in one direction by the polarized light plate 2. P-polarized light or S-polarized light may be emitted from the polarized light plate 2.

As shown, the polarized light plate 2 is disposed so that one surface thereof faces the display panel 1. In particular, the polarized light plate 2 is disposed so that the other surface thereof faces the inside of the main body 7. The polarized light plate 2 can also be disposed to cover a light emission surface of the display panel 1 and be disposed above the display panel 1.

In addition, the image light emitted from the display panel 1 is incident into the polarized light plate 2 through one surface of the polarized light plate 2, and the light polarized by the polarized light plate 2 is emitted to the inside of the main body 7. Then, the reflection mirror 3 reflects the image light passing through the polarization reflection mirror 5 toward the windshield 6.

As shown, the reflection mirror 3 is disposed at a front side of the polarization reflection mirror 5 and has a rear surface facing a front surface 51 of the polarization reflection mirror 5 in a front and rear direction. The reflection mirror 3 may be, for example, a concave mirror.

The reflection mirror 3 is accommodated into the main body 7 and is mounted to be inclined at a predetermined angle within the main body 7 and reflect the image light passing through the polarization reflection mirror 5 upward. Here, the upward direction includes a vertical direction, an upward direction that is inclined backward at a predetermined angle, and an upward direction that is inclined forward at a predetermined angle.

As shown in FIG. 2, the reflection mirror 3 is supported by a reflection mirror support 31 and has a front surface facing the reflection mirror support 31 in the front and rear direction. The reflection mirror support 31 together with the reflection mirror 3 can also be accommodated into the main body 7.

Further, the reflection mirror support 31 can be rotatably disposed within the main body 7 and a motor 32 for rotating a rotation shaft of the reflection mirror support 31 can be connected to the reflection mirror support 31. The motor 32 can also be mounted on the main body 7. In addition, the reflection mirror 3 rotates together with the reflection mirror support 31 when the motor 32 is driven. When the rotation shaft is a horizontal rotation shaft, the reflection mirror 3 can vertically rotate with respect to the horizontal rotation shaft.

In addition, the phase retardance mirror 4 may be spaced apart from the reflection mirror 3 and convert a phase of the image light incident from the front thereof to reflect the image light having the converted phase forward. Also, the polarization reflection mirror 5 may be disposed between the reflection mirror 3 and the phase retardance mirror 4 to reflect the image light passing through the polarized light plate 2 to the phase retardance mirror 4 and convert a phase of the image light in the phase retardance mirror 4 so that the reflected image light is transmitted.

The polarization reflection mirror 5 may be a polarization splitter through which linearly polarized light having a phase difference of 90° with respect to the linearly polarized light emitted from the polarized light plate 2 is transmitted. Particularly, when the polarized light plate 2 polarizes the image light emitted from the display panel 1 to generate the P-polarized light, the polarization reflection mirror 5 can be a polarization splitter by which the P-polarized light is reflected, and the S-polarized light is transmitted.

Further, when the polarized light plate 2 polarizes the image light emitted from the display panel 1 to generate the S-polarized light, the polarization reflection mirror 5 can be a polarization splitter by which the S-polarized light is reflected, and the P-polarized light is transmitted. The phase retardance mirror 4 may also be disposed at a rear side of the polarization reflection mirror 5. At least a portion of a front surface 46 of the phase retardance mirror 4 may be disposed to face at least a portion of a rear surface 52 of the polarization reflection mirror 5.

The phase retardance mirror 4 may include a rear mirror 41 and a phase retarder 44 disposed on a front surface 42 of the rear mirror 41. The rear mirror 41 may include a transparent plate 41A and a reflection layer 41B disposed on a rear surface of the transparent plate 41A. In the phase retardance mirror 4, a distance between the rear mirror 41 and the phase retarder 44 may be minimized, and the rear mirror 41 and the phase retarder 44 may be integrated with each other.

The phase retarder 44 may be attached to the front surface 42 of the rear mirror 41 by using an adhesive 48. A rear surface 47 of the phase retarder 44 may be attached to the front surface 42 of the transparent plate 41A by using an adhesive, i.e., a transparent adhesive.

When the rear mirror 41 is spaced a predetermined distance from the phase retarder 44, the head up display for the vehicle may have a front/rear width that increases by the distance between the rear mirror 41 and the phase retarder 44. Also, each of the rear mirror 41 and the phase retarder 44 may be independently mounted. In this instance, the number of assembly processes increases, and also, the structure of the head up display is complicated due to the fixing structure for fixing the rear mirror 41 and the fixing structure for fixing the phase retarder 44.

Further, when the phase retarder 44 is disposed on the front surface 42 of the rear mirror 41, the head up display for the vehicle can be minimized in front/rear width. Also, since the phase retarder 44 and the rear mirror are fixed together, the structure can be simplified.

When the image light is incident into the phase retardance mirror 4 from the front side of the phase retardance mirror 4, the image light is primarily converted in phase while passing through the phase retarder 44. Then, the image light that is converted in phase is reflected forward by the rear mirror 41.

The image light that is reflected forward by the rear mirror 41 is secondarily converted again in phase while passing through the phase retarder 44. As described above, the primarily and secondarily converted light are emitted forward from the phase retarder 44.

In addition, the rear mirror 41 may be a flat mirror having the flat front surface 42. Since the rear mirror 41 has the flat front surface 42, the rear surface 45 of the phase retarder 44 may be closely attached to the front surface 42 of the rear mirror 45. Thus, the phase retarder 44 can be maintained with high reliability on the front surface 42 of the rear mirror 41 when compared to when the rear mirror 41 has a curved front surface.

Further, the front surface 46 of the phase retarder 44 faces the rear surface 52 of the polarization reflection mirror 5 in the front and rear direction. Here, the front surface 46 of the phase retarder 44 may be a front surface of the phase retardance mirror 4. The rear surface 45 of the phase retarder 44 may be attached to the front surface 42 of the flat plate mirror.

The phase retarder 44 may be a quarter wave plate as an optical device for converting a polarized state of transmitting light and may include a circular polarizer. The phase retarder 44 retards a phase of linearly polarized light, which is incident by being reflected by the polarization reflection mirror 5, by a quarter wavelength and retards a phase of linearly polarized light, which is reflected by the rear mirror 41, by a quarter wavelength.

That is, when the P-polarized light P is incident from the front of the phase retardance mirror 4 to the phase retardance mirror 4, the S-polarized light S that is converted in phase by an angle of 90° with respect to the P-polarized light P is emitted forward from the phase retardance mirror 4. Further, when the S-polarized light is incident from the front of the phase retardance mirror 4 to the phase retardance mirror 4, the P-polarized light that is converted in phase by an angle of 90° with respect to the S-polarized light S is emitted forward from the phase retardance mirror 4.

The polarization reflection mirror 5 may be a polarization splitter through which the linearly polarized light emitted from the polarized light plate 2 is reflected to the front surface 46 of the phase retardance mirror 4. Also, the polarization reflection mirror 5 can transmit the linearly polarized light that is emitted from the phase retardance mirror 4.

For example, the P-polarized light is incident from the polarized light plate 2, the incident P-polarized light is reflected to the front surface of the phase retardance mirror 4. When the S-polarized light is emitted to the front of the phase retardance mirror 4, the S-polarized light can be transmitted.

Further, the S-polarized light is incident from the polarized light plate 2, the incident S-polarized light can be reflected to the front surface of the phase retardance mirror 4. When the P-polarized light is emitted to the front of the phase retardance mirror 4, the P-polarized light is transmitted.

Further, the polarization reflection mirror 5 is disposed at a rear side of the reflection mirror 3. At least a portion of the front surface of the polarization reflection mirror 5 may be disposed to face at least a portion of a rear surface 33 of the reflection mirror 3.

The entire size of the head up display for the vehicle can be determined according to sizes and positions of the polarized light plate 2, the phase retardance mirror 4, and the polarization reflection mirror 5. Here, the polarized light plate 2, the phase retardance mirror 4, and the polarization reflection mirror 5 are preferably disposed at optimal positions and with optimal sizes in the entire size of the head up display for the vehicle is minimized.

In addition, the polarization reflection mirror 5 can be preferably formed with a size in which the polarization reflection mirror 5 can receive the linearly polarized light emitted from the polarized light plate 2 and the linearly polarized light emitted from the phase retardance mirror 4. Here, the phase retardance mirror 4 may have a size less than that of the polarization reflection mirror 5, and at least one of the phase retardance mirror 4 and the polarization reflection mirror 5 may be obliquely disposed.

Each of the phase retardance mirror 4 and the polarization reflection mirror 5 may be determined in inclined angle according to the position and angle of the polarized light plate 2. The phase retardance mirror 4 can be disposed at a position and an angle at which the phase retardance mirror 4 does not prevent the linearly polarized light emitted from the polarized light plate 2 from being incident into the polarization reflection mirror 5. The polarized light plate 2 can be disposed at a lower side between the polarization reflection mirror 5 and the phase retardance mirror 4.

In this instance, the display panel I can emit the image light upward. Here, the upward irradiation includes all vertical irradiation, upward irradiation that is inclined backward at a predetermined angle, and upward irradiation that is inclined forward at a predetermined angle. At least a portion of a top surface of the polarized light plate 2 can be disposed to face the rear surface 52 of the polarization reflection mirror 5. The polarized light plate 2 can be disposed at a position and angle at which the polarized light plate 2 does not face the phase retardance mirror 4.

The phase retardance mirror 4 and the polarization reflection mirror 5 are disposed so that the phase retardance mirror 4 and the polarization reflection mirror 5 gradually approach each other upward. The phase retardance mirror 4 and the polarization reflection mirror 5 are inclinedly disposed. In this instance, the phase retardance mirror 4 may be disposed to be inclined in a direction A in which the front surface 46 thereof faces a front lower side, and the polarization reflection mirror 5 may be disposed to be inclined in a direction B in which the rear surface 52 thereof faces a rear lower side.

Further, the polarization reflection mirror 5 and the reflection mirror 3 can be disposed in directions opposite to each other, respectively. The reflection mirror 3 can be disposed to be inclined in a direction C in which the rear surface thereof 33 faces a rear upper side, and the polarization reflection mirror 5 can be disposed to be inclined in a direction in which the front surface 51 thereof faces a front upper side. The polarization reflection mirror 5 and the reflection mirror can be disposed to gradually approach each other downward.

Referring to FIG. 3, the head up display includes the main body 7 having an inner space 71 and a top cover 8 disposed on an upper portion of the main body 71 and having an upper opening 81. The head up display further includes a window 82 disposed in the upper opening 81.

The head up display for the vehicle further includes a holder 10 that is fixed together with the polarization reflection mirror 5 and the phase retardance mirror 4. The polarization reflection mirror 5, the phase retardance mirror 4, and the holder 10 may constitute a mirror assembly M. The mirror assembly M can also be inserted and accommodated into a space 71. The mirror assembly M can be disposed to be spaced apart from the reflection mirror 3 in the space 71.

The reflection mirror 3 and the holder 10 may be mounted to be spaced apart from each other in the space 71. The holder 10 may be provided as one member or an assembly of a plurality of members. Further, the polarization reflection mirror 5 and the phase retardance mirror 4 can be inserted into the main body 71 when the polarization reflection mirror 5 and the phase retardance mirror 4 are supported by the holder 10 or can be fixed by the holder 10.

In addition, the holder 10 includes an inner holder 100 on which the phase retardance mirror 4 and the polarization reflection mirror 5 are seated and supported. The inner holder 100 includes a rear seat groove 111 in which the phase retardance mirror 4 is seated and a front seat groove 112 in which the polarization reflection mirror 5 is seated.

The holder 10 may further include a polarization reflection mirror cover 110 covering a front edge of the polarization reflection mirror 5 and a phase retardance mirror cover 120 covering the rear surface 43 of the phase retardance mirror 4. The polarization reflection mirror cover 110 can cover the front edge of the polarization reflection mirror 5 seated on the inner holder 100, and the polarization reflection mirror 5 may be fixed between the polarization reflection mirror cover 110 and the inner holder 100.

The phase retardance mirror cover 120 can cover the rear surface of the phase retardance mirror 4 seated on the inner holder 100, and the phase retardance mirror 4 can be fixed between the phase retardance mirror cover 120 and the inner holder 100. The holder 10 further includes a shield cover 130 surrounding the phase retardance mirror cover 120 and the polarization reflection mirror cover 110. The head up display for the vehicle can thus prevent the image light from leaking to a region except for the set path for the image light, and the shield cover 130 can shield the region except for the set path.

Further, the shield cover 130 may be an outer cover disposed outside the phase retardance mirror cover 120, the inner holder 100, and the polarization reflection mirror cover 110. The shield cover 130 can have a three-dimensional shape and include a rear body covering the phase retardance mirror cover 120, a front body 133 covering the polarization reflection mirror cover 110, and an upper body 134 connecting the rear body 132 to the front body 133.

The shield cover 130 includes a light transmission window 131 through which the image light is transmitted, between the polarization reflection mirror 5 and the reflection mirror 3. The light transmission window 131 is provided in the front body 133 and opened forward and backward.

The head up display for the vehicle may further include a control board 140 controlling the display panel 1 and a shield 150 protecting the control board 140. The control board 140 can be disposed in an inner lower portion of the space 71 or disposed under a bottom plate of the main body 7. The shield 150 can be disposed to surround the control board 140.

Hereinafter, operations of the head up display including the above-described constituents will be described. First, the display panel 1 is turned on to emit image light, and the image light emitted from the display panel 1 is polarized into P-polarized light P or S-polarized light S while passing through the polarized light plate 2. Hereinafter, for convenience of description, the P-polarized light being emitted from the polarized light plate 2 will be described as an example.

The linearly polarized light P emitted from the polarized light plate 2 is emitted to the rear surface 52 of the polarization reflection mirror 5. Then, the linearly polarized light P is reflected by the polarization reflection mirror 5 and reflected to the front surface of the phase retardance mirror 4.

The linearly polarized light incident into the phase retardance mirror 4 is converted in phase to an angle of 90° by the phase retardance mirror 4 and then reflected to a front side of the phase retardance mirror 4. The linearly polarized light S that is converted in phase is incident into the rear surface 33 of the reflection mirror 3, and the reflection mirror 3 reflects the image light to the windshield 6. A virtual image K displayed on a front position of the windshield may be recognized by driver's eyes boarding on the vehicle.

Figure 5:
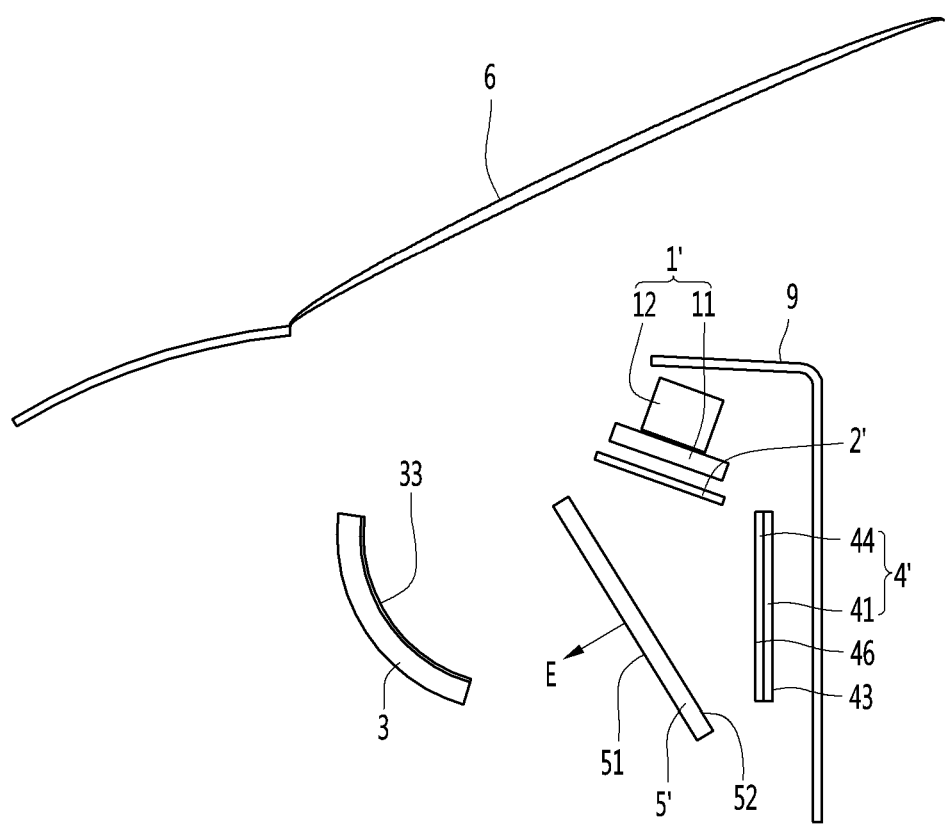
FIG. 5 is a side view illustrating main components of a head up display for a vehicle according to another embodiment.
Figure 6:
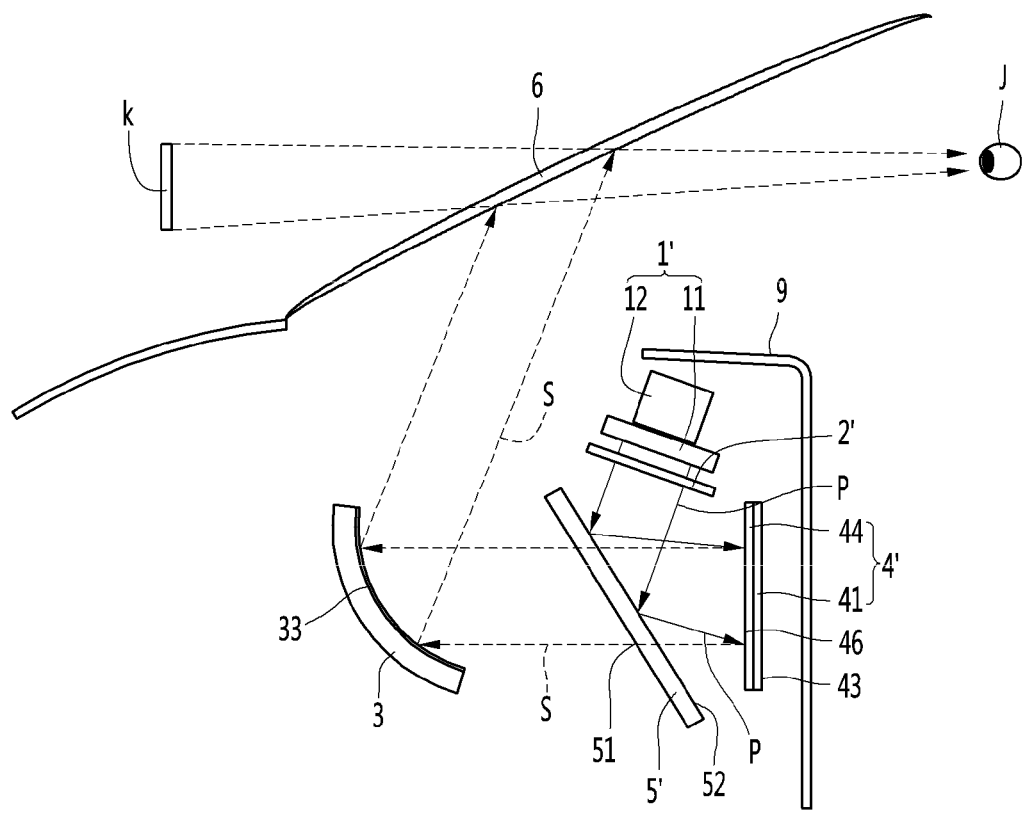
FIG. 6 is a side view illustrating an image path of the heat up display for the vehicle according to another embodiment.
Figure 7:
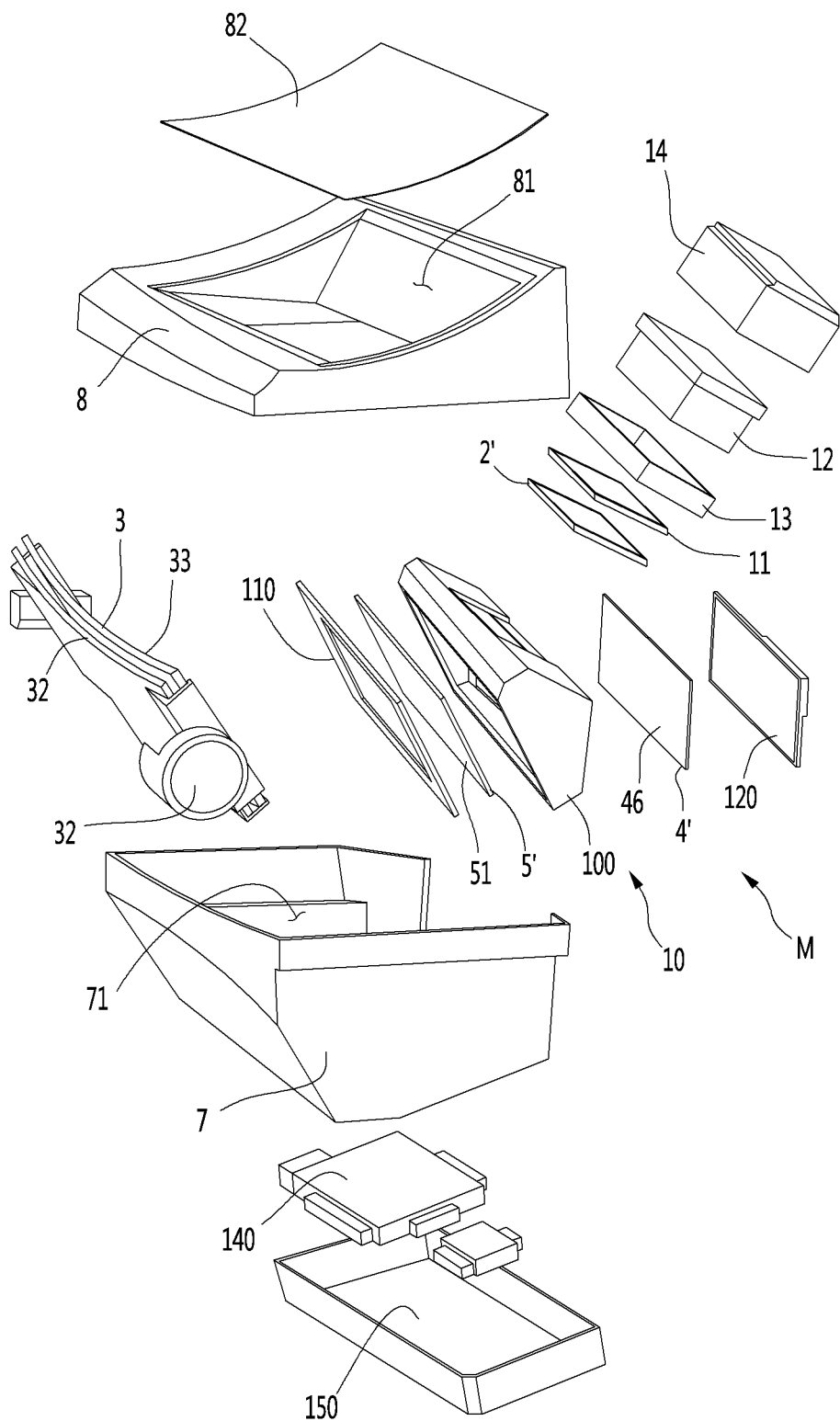
FIG. 7 is an exploded perspective view of the head up display for the vehicle according to another embodiment.
Figure 8:
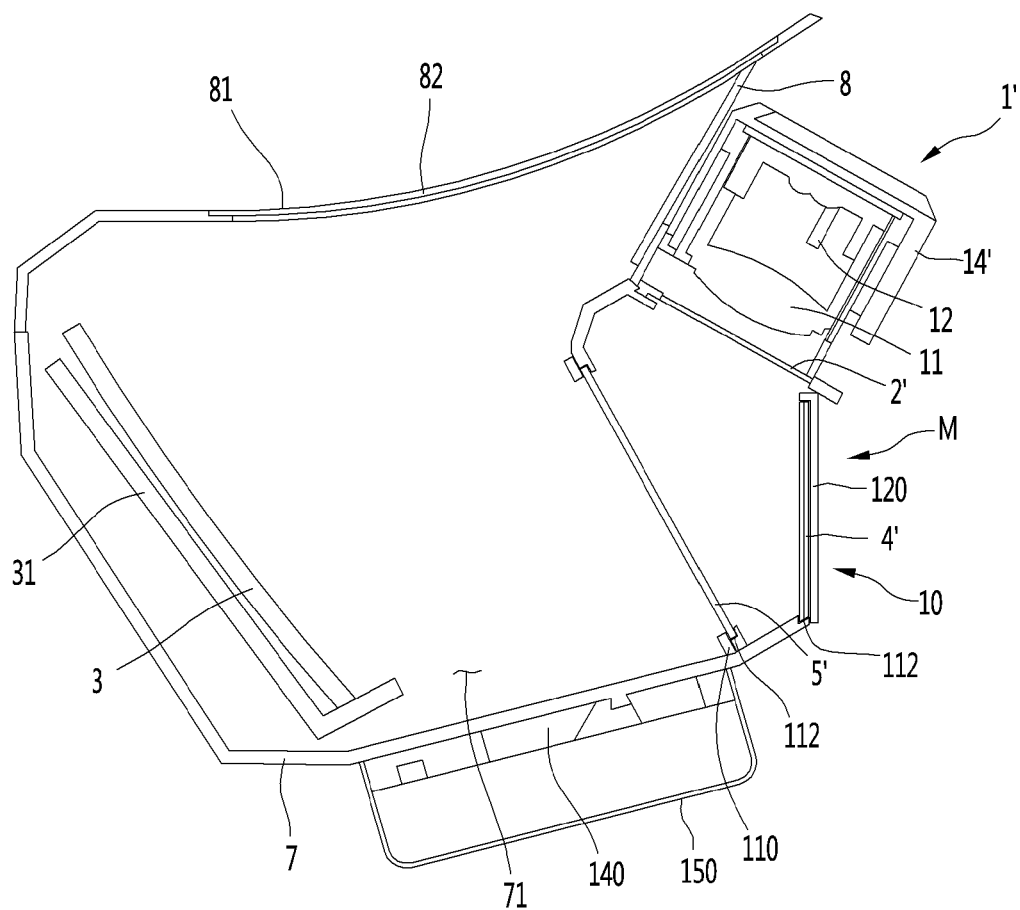
FIG. 8 is a cross-sectional view of the head up display for the vehicle according to another embodiment.

Next, FIG. 5 is a side view illustrating main components of a head up display, FIG. 6 is a side view illustrating an image path of the head up display, FIG. 7 is an exploded perspective view of the head up display, and FIG. 8 is a cross-sectional view of the head up display according to another embodiment.

In the present embodiment, a polarized light plate 2' can be disposed between a polarization reflection mirror 5' and a phase retardance mirror 4', and a display panel 1' emit image light downward. Here, the downward irradiation may include all vertical irradiation and downward irradiation that is inclined forward at a predetermined angle. In this instance, the phase retardance mirror 4' and the polarization reflection mirror 5' gradually approach each other downward. Also, the polarization reflection mirror 5' can be disposed to be inclined in a direction E in which a front surface 51 of the polarization reflection mirror 5' face a front lower side.

The present embodiment is the same as the foregoing embodiment except for positions of the display panel 1' and the polarized light plate 3' and except that the polarization reflection mirror 5' is disposed to be inclined in a direction opposite to that of the polarization reflection mirror 5. Thus, since the present embodiment is equal or similar to the foregoing embodiment except for the positions of the display panel 1' and the polarized light plate 3' and the arranged direction of the polarization reflection mirror 5', their detailed descriptions will be omitted.

The phase retardance mirror 4' can be disposed to be inclined at a predetermined angle, for example, may be vertically disposed. When the phase retardance mirror 4' is vertically disposed, the head up display can be minimized in the front/rear with, and the phase retardance mirror 4' can be vertically disposed or disposed to be inclined at an angle similar to a vertical direction.

When the phase retardance mirror 4' is vertically disposed, the polarization reflection mirror 5' can be disposed in a direction that is away upward from the phase retardance mirror 4'. A heat dissipation device 14' for releasing heat generated from the display panel 1' can be disposed at a rear side of a top cover 8 and be protected by the top cover 8.

Also, the display panel 1' emits the image light in a direction that is inclined to a front lower side when the display panel 1' is disposed at a rear side of the top cover 8. In the head up display for the vehicle, a portion of solar light may be incident into a main body 7 by passing through a window 82. When the incident solar light is directly irradiated to the polarization reflection mirror 5', the irradiated solar light may be reflected inside the main body 7 and then incident into the display panel 1'.

In the present embodiment, since the polarization reflection mirror 5' is disposed to be inclined in a direction E that a front surface 51 thereof faces a front lower side, the phenomenon in which the solar light incident into the main body 7 by passing through the window 82 is reflected by the polarized reflection mirror 5' and damage of the display panel 1' due to the solar light can be minimized.

Figure 9:
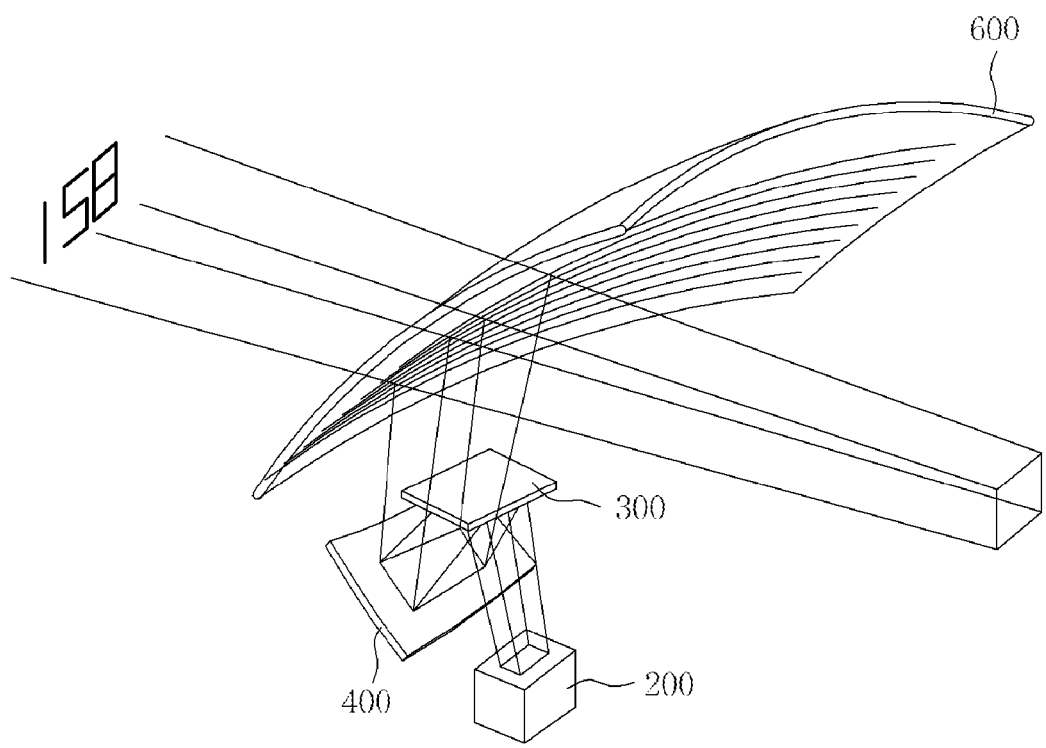
FIG. 9 is a perspective view of a head up display for a vehicle according to further another embodiment.
Figure 10:
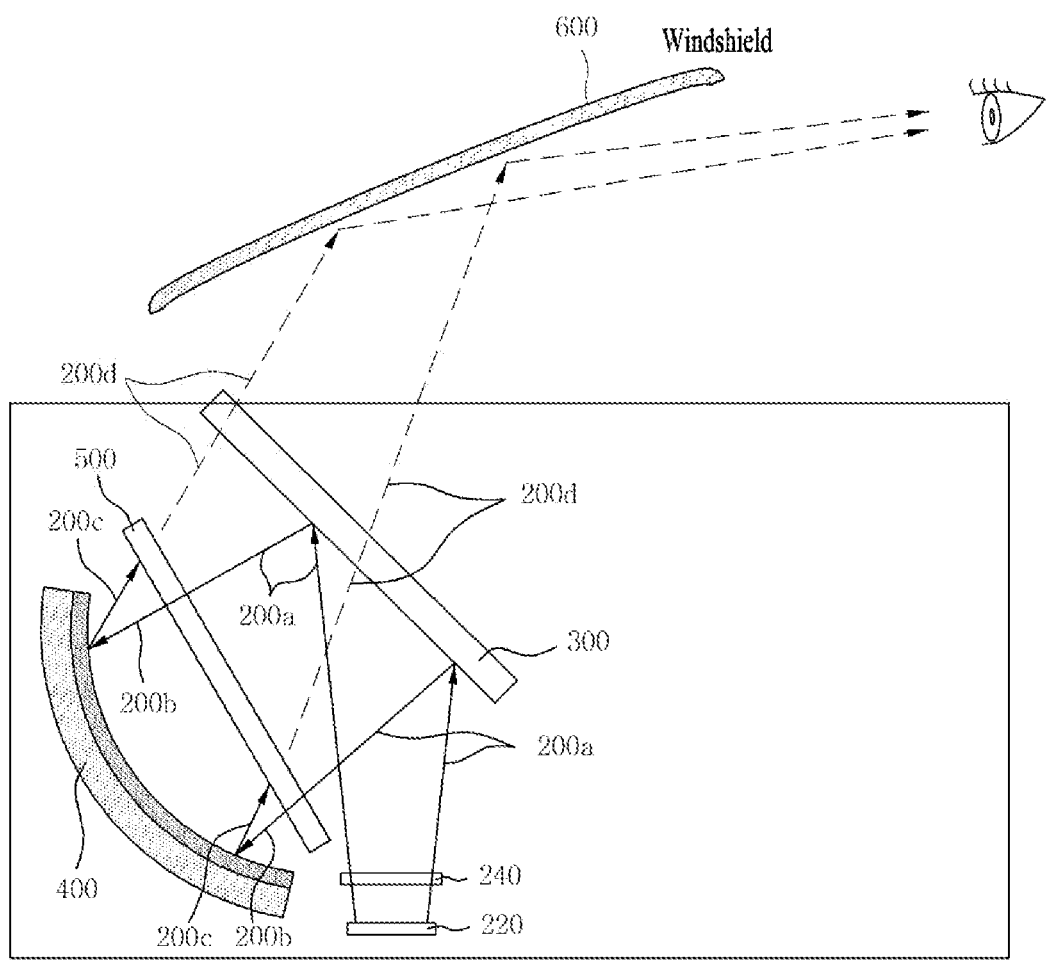
FIG. 10 is a schematic view of the head up display for the vehicle according to further another embodiment.

Next, FIGS. 9 and 10 are schematic views of a head up display for a vehicle according to further embodiment. As shown, the head up display for the vehicle includes a light source 200, a first mirror 300, a phase retarder 500, and a second mirror 400.

The light source 200 generates light, and refers to a device that generates an image to be displayed on a windshield 600 in order to show driving information to a driver. Further, the image contains driver information to be provided to the driver, and the driver information may include, for example, the condition of the vehicle, road information, or navigation information.

In addition, the light source 200 generates light that is linearly polarized in a given direction. That is, the light source 200 provides first linearly polarized light 200a that is linearly polarized in the given direction. The polarized light corresponds to light in which the direction of an electric field is constant in any plane perpendicular to the direction in which the light travels. The types of polarized light include linearly polarized light, circularly polarized light, and elliptically polarized light.

In addition, the linearly polarized light is light in which the direction in which the electric field of a light wave vibrates is perpendicular to the direction in which the light travels, and in which the amplitude of vibration is constant. Further, the circularly polarized light is light in which the direction in which the electric field of a light wave vibrates rotates while remaining perpendicular to the direction in which the light travels, and in which the amplitude of vibration is constant. The elliptically polarized light is light in which the direction in which the electric field of a light wave vibrates elliptically rotates while remaining perpendicular to the direction in which the light travels, and in which the amplitude of vibration is not constant.

To provide the light that is linearly polarized in a given direction, the light source 200 includes a display panel 220, and a first polarizer 240 configured to polarize light emitted from the display panel 220. Further, the display panel 220 generates an image to be transmitted to the driver. That is, the display panel 220 generates an image by controlling electrical signals. For example, the display panel 220 may include a Liquid Crystal Display (LCD) panel, a Light Emitting Diode (LED) panel, or an Organic Light Emitting Diode (OLED) panel. In addition, the first polarizer 240 may be omitted when the display panel 220 includes a polarizer therein and functions to emit linearly polarized light, like an LCD panel.

In addition, the first polarizer 240 is configured as a linear polarizer that polarizes the light that forms the image provided on the display panel 220 in a given direction. As such, the light emitted from the display panel 220 is linearly polarized in the given direction once it has passed through the linear polarizer 240. In this instance, the light emitted from the display panel 220 is changed into first linearly polarized light 200a that has been polarized in the given direction while passing through the first polarizer 240.

Further, the first mirror 300 reflects the first linearly polarized light 200a emitted from the light source 200. However, unlike existing reflection mirrors, the first mirror 300 of the present embodiment reflects the first linearly polarized light 200a, but passes light that has been linearly polarized in a different direction from that of the first linearly polarized light 200a. That is, the first mirror 300 is configured as a polarization reflection mirror that reflects light polarized in the given direction, and passes light polarized in a direction perpendicular to the given direction.

For example, the first mirror 300 reflects P-polarized light when passing S-polarized light, and reflects S-polarized light when passing P-polarized light. In addition, the first mirror 300 accommodates a wide range of angle of incidence due to the characteristics of the HUD device, and therefore is preferably configured as, for example, a wire grid, which minimizes deterioration in performance (e.g. transmittance/reflectance and contrast) depending on the angle of incidence.

That is, any element capable of achieving the same performance (e.g. transmittance of selectively polarized light and contrast) at a wide angle of incidence may be used as the first mirror serving as a polarization reflection mirror. Thus, an image is provided having uniform brightness throughout an entire eye box in which the driver observes a virtual image, and the loss of light from the light source is minimized.

Further, the phase retarder 500 passes the first linearly polarized light 200a and converts the same into first circularly polarized light 200b. That is, once the light linearly polarized in the given direction has passed through the phase retarder 500, circularly polarized light is discharged. In further another embodiment, the phase retarder 500 is a quarter-wave plate in which the major axis is tilted by 45 degrees in relation to the direction in which the first circularly polarized light 200b vibrates. Thus, the phase retarder 500 retards the phase of light introduced into the circular polarizer by a quarter wave.

Further, the phase retarder converts the introduced linearly polarized light into right-handed circularly polarized light or left-handed circularly polarized light according to the direction in which the major axis is tilted. This is an inherent characteristic of the phase retarder.

In addition, the phase retarder includes a wide range of angle of incidence due to the characteristics of the HUD device, and therefore is preferably configured as, for example, a polymer retarder, which minimizes deterioration in performance (e.g., phase retardance variation) depending on the angle of incidence. That is, any element capable of achieving the same performance (phase retardance) at the wide angle of incidence may be used as the phase retarder according to the present embodiment. This provides an image having uniform brightness throughout the entire eye box in which the driver observes a virtual image, and minimizes the loss of light from the light source.

Further, the first circularly polarized light 200b is introduced into the second mirror 400 and is reflected as second circularly polarized light 200c. That is, the first circularly polarized light 200b is changed in the rotation direction of circularly polarized light while being reflected by the second mirror 400, thereby being converted into the second circularly polarized light 200c. For example, when the first circularly polarized light 200b is right-handed circularly polarized light, the converted second circularly polarized light 200c is left-handed circularly polarized light. When the first circularly polarized light 200b is left-handed circularly polarized light, the converted second circular polarized light 200c is right-handed circularly polarized light.

The head up display for the vehicle according to the further another embodiment is configured so the second circularly polarized light 200c reflected by the second mirror 400 passes the phase retarder 500 and the first mirror 300 in sequence to thereby reach the windshield 600. In addition, the second circularly polarized light 200c, reflected by the second mirror 400, is converted into second linearly polarized light 200d while passing through the phase retarder 500. This is because the circularly polarized light is converted into linearly polarized light while passing through the phase retarder 500 in the form of a quarter-wave plate as described above.

Once the second circularly polarized light 200c has passed through the phase retarder 500, the second circularly polarized light 200c is changed into the second linearly polarized light 200d having a different direction from the polarization direction of the first linearly polarized light 200a. In other words, the directions of polarization of the first linearly polarized light 200a and the second linearly polarized light 200d are perpendicular to each other. For example, when the first linearly polarized light 200a is S-polarized light, the second linearly polarized light 200d is P-polarized light. When the first linearly polarized light 200a is P-polarized light, the second linearly polarized light 200d is S-polarized light.

In this instance, the second linearly polarized light 200d may pass through the first mirror 300. This is because the first mirror 300 is provided to reflect the first linearly polarized light 200a and to pass the second linearly polarized light 200d as described above. The second linearly polarized light 200d having passed through the first mirror 300 then forms an image on the windshield 600, and the image contains information to be provided to the driver.

Accordingly, the first mirror 300 may be provided between the second mirror 400 and the windshield 600. That is, the first mirror 300 is provided in the path of the second linearly polarized light 200d. As such, the volume of the HUD device is reduced. In addition, the distances between the inner components are reduced, resulting in a display device having a compact configuration.

Further, the position of the first mirror 300 does not need to be determined such that all of the second linearly polarized light 200d passes through the first mirror 300. Minimizing the amount of second linearly polarized light 200d that passes through the first mirror 300 may minimize the loss in the intensity of an image formed on the windshield 600. For this reason, the volume of the HUD device can be reduced within a range in which the amount of second linearly polarized light 200d passing through the first mirror 300 is minimized.

However, when only a portion of the second linearly polarized light 200d passes through the first mirror 300 so as to form an image on the windshield 600, the brightness of the image may differ between a portion that passes through the first mirror 300 and the remaining portion. To solve this problem, the arrangement of the first mirror 300 can be adjusted so as to allow all of the second linearly polarized light 200d to pass through the first mirror 300. As such, the difference in the brightness of the image and the volume of the HUD device can be minimized, which enhances the use of space inside the vehicle when the HUD device is installed in the limited space inside the vehicle.

In addition, the phase retarder 500 is provided in the path of the second circularly polarized light 200c reflected by the second mirror 400. In other words, the phase retarder 500 is positioned to allow both the light to be introduced into the second mirror 400 and the light reflected by the second mirror 400 to pass through the phase retarder 500. The position of the phase retarder 500 can be placed such that both the first circularly polarized light 200b and the second circularly polarized light 200c pass through the phase retarder 500.

Accordingly, the phase retarder 500 is preferably located close to the second mirror 400. In addition, the phase retarder 500 may be secured to the second mirror 400, which reduces the number of components within the HUD device. Further, the second mirror 400 according to a further another embodiment and the previously described concave mirror 30 of the related HUD device have a similar function. That is, the second mirror 400 reflects light containing driver information to the windshield 600 so as to provide the driver with an image containing the driver information.

In addition, as shown in FIG. 10, a light incident surface of the second mirror has a concave curvature. That is, the second mirror 400 is configured as a concave mirror. In this instance, although the radius of curvature of the second mirror 400 may be constant, the second mirror 400 may have an aspheric surface. Thus, the distortion that may occur at the outer portion of the image may be minimized.

The display device of the present embodiment is configured such that the path along which the light travels from the light source 200 to the second mirror 400 is present within the focal length of the second mirror 400. That is, the path of light from the light source 200 to the second mirror 400 must be shorter than the focal length of the second mirror 400.

In this instance, when an object is present within the focal length of the second mirror 400, which has the form of a concave mirror, an image formed by light reflected by the second mirror 400 appears as an erect image that is larger than the object. Thus, an image that is larger than the image from the light source 200 is projected onto the windshield 600, and the user can view a large screen image containing driving information. In other words, the image formed by the second circularly polarized light 200c as the first circularly polarized light 200b is introduced into the second mirror 400 is an erect virtual image.

Considering the operation of the head up display for the vehicle according to another embodiment, when P-polarized light is generated in the light source 200, the first mirror 300 reflects the P-polarized light, and the reflected light is converted into right-handed (or left-handed) circularly polarized light while passing through the phase retarder 500. Then, the light is converted into left-handed (or right-handed) circularly polarized light by being reflected by the second mirror 400 and is then converted into S-polarized light by again passing through the phase retarder 500, finally passing through the first mirror 300. The S-polarized light having passed through the first mirror 300 is reflected to the windshield 600, thereby forming an image providing information to the driver.

In contrast, when S-polarized light is generated in the light source 200, the first mirror 300 reflects the S-polarized light, and the reflected light is converted into right-handed (or left-handed) circularly polarized light while passing through the phase retarder 500. Then, the light is converted into left-handed (or right-handed) circularly polarized light by being reflected by the second mirror 400 and is then converted into P-polarized light by again passing through the phase retarder 500, finally passing through the first mirror 300. The S-polarized light having passed through the first mirror 300 is reflected to the windshield 600, thereby forming an image providing information to the driver.

Figure 11:
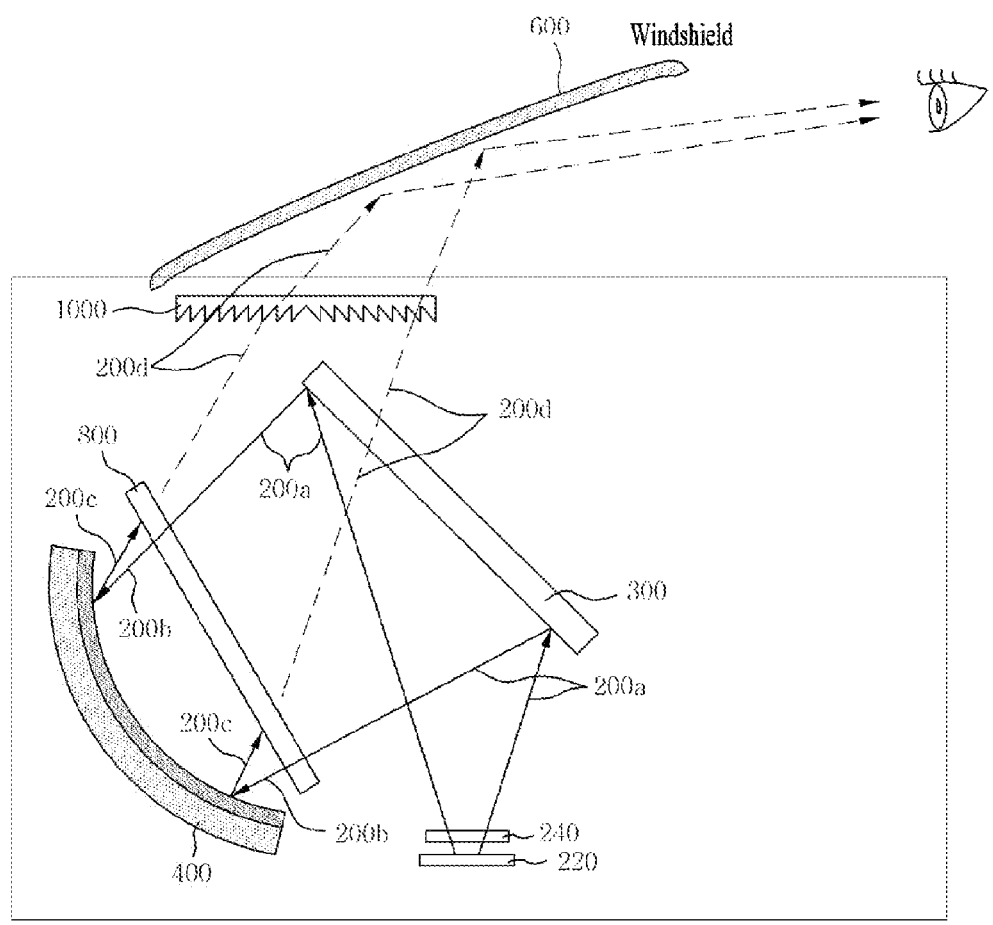
FIG. 11 is a schematic view of a head up display for a vehicle according to further another embodiment.

Next, FIG. 11 is a schematic view of a head up display for a vehicle according to another embodiment including a first optical lens 2000 in the path of the second linearly polarized light 200*d* and reduces the difference in the paths of light. In more detail, the first optical lens 2000 is a Fresnel lens, which is a condensing lens that gathers light, like a convex lens while having a reduced thickness. That is, the lens having a reduced thickness serves as a convex lens because the lens is divided into several bands such that each band acts as a prism.

Accordingly, the first optical lens 2000 enables the display of a larger image than an image formed on the windshield 200 by the second linearly polarized light 200*d*. Through the use of the Fresnel lens, the sizes of the first mirror 300 and the second mirror 400 can be reduced compared to when the same size of image is formed on the windshield 600.

In this instance, the Fresnel lens is provided in the path of the second linearly polarized light 200*d* so that all of the second linearly polarized light 200*d* passes through the Fresnel lens. Further, in another embodiment, a third mirror may be additionally located to achieve additional performances of the HUD device as well as internal optical paths.

Hereinafter, a head up display for a vehicle according to an embodiment will be described with reference to FIG. 10. The head up display for the vehicle in this embodiment includes the display panel 220, the first mirror 300, the second mirror 400, and the windshield 600.

The display panel 220 provides an image containing, for example, driving information to be provided to the driver, and the driver information may include, for example, the current condition of the vehicle, road information, the condition of the surrounding environment, or navigation information. The image provided by the display panel 220 is light that is not yet polarized, and the display panel may be an LCD panel, an LED panel, or an OLED panel.

Further, the first mirror 300 may be configured as a beam splitter used to split introduced light into two at a designated ratio. Thus, a portion of light introduced into the beam splitter passes through the beam splitter, and the remaining portion of light is reflected by the beam splitter. The types of the beam splitter include a flat plate beam splitter and a cube beam splitter. One example of the flat plate beam splitter is a half mirror.

In addition, the second mirror 400 is configured as a concave mirror, the light incident surface of which has a concave curvature. Although the radius of curvature of the second mirror 400 may be constant, the second mirror 400 may have an aspheric surface. Thus, it is possible to minimize distortion that may occur at the outer portion of the image.

Further, light generated in the display panel 220 is introduced into the first mirror 300. As discussed above, the first mirror 300 is a beam splitter dividing the light generated in the display panel 220 into first transmitted light transmitted through the first mirror 300 and first reflected light reflected by the first mirror 300.

Although the first transmitted light may be refracted and changed in the direction in which the light travels according to the type of the beam splitter, most of the first transmitted light moves straight toward the windshield 600. In addition, the first transmitted light is reflected by the windshield 600 so as to reach the driver's eyes and form a virtual image in front of the windshield 600. However, the first transmitted light is not enlarged by the second mirror 400, and therefore is not used to form a virtual image that transmits driving information to the driver.

Further, the first reflected light is introduced into the second mirror 400 and reflected and enlarged by the second mirror 400 that is the concave mirror. The reflected and enlarged light can be defined as second reflected light. Some or all of the second reflected light can be introduced into the first mirror 300.

In this instance, the second reflected light is divided into second transmitted light transmitted through the first mirror 300 and third reflected light reflected by the first mirror 300. Although the third reflected light may again be reflected by the second mirror 400 and returned to the first mirror 300, the amount of the returned light is considerably small, or the path of light considerably deviates from a range in which the light may reach the driver's eyes. Thus, the returned light is negligible.

In addition, the second transmitted light is introduced into the windshield 600. Then, the second transmitted light is reflected by the windshield 600 to thereby reach the driver's eyes. Therefore, the driver can view a virtual image formed in front of the windshield 600. For example, assuming that the loss of reflection or transmission at the first mirror 300 and the second mirror 400 is zero and that the ratio of reflection to transmission at the first mirror 300 is 1:1, light (100%) generated in the display panel 220 is divided into first transmitted light (50%) and first reflected light (50%) by the first mirror 300, and the first reflected light (50%) is reflected by the second mirror 400 and becomes second reflected light (50%), and in turn the second reflected light (50%) is divided into second transmitted light (25%) and third reflected light (25%) while passing through the first mirror 300.

In this way, only the second transmitted light (25%) reaches the windshield 600. That is, only the second transmitted light (25%) of the light (100%) generated in the display panel 220 reaches the windshield 600 so as to form a virtual image in front of the windshield 600. Although forming the virtual image in front of the windshield 600 using light of approximately 25% may cause low resolution, no phase retarder or polarizer is required, which results in a reduction in the volume of the display device.

As is apparent from the above description, the HUD according to the embodiments enhances the driving efficiency of the driver and improves the safety of driving. In addition, the driver is provided with large amounts of information through the display device, which enables an increase in the size of a virtual image displayed on a windshield, thereby providing a large screen to realize the provision of various pieces of information.

In addition, the display device occupies only a minimal space and has a reduced volume thereof, thereby ensuring the efficient use of space when installed inside a vehicle. In addition, minimal distances are provided between inner components thereby reducing the overall size of the HUD device.

According to the embodiments, the phase retardance mirror may include the rear mirror and the phase retarder disposed on the front surface of the rear mirror to realize the compactness and minimize the front/rear width. Also, the phase retarder can be attached to the front surface of the rear mirror that is the flat plate mirror to minimize the phenomenon in which the phase retarder and the rear mirror are randomly separated from each other by the vibration.

The polarized light plate, the polarization reflection mirror, and the phase retardance mirror are optimally disposed to minimize the whole size of the head up display for the vehicle. Since the polarization reflection mirror and the phase retardance mirror are mounted on the holder, and the holder is inserted and mounted in the space of the main body, the process of assembling the device is improved compared to when the polarization reflection mirror and the phase retardance mirror are independently mounted on and separated from the main body. Also, the shield body prevents the image light from leaking to the region except for the light path that is set in the main body to improve the efficiency and the reliability.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A head up display for a vehicle, the head up display comprising:
    a display panel configured to emit image light;
    a polarized light plate configured to linearly polarize the image light emitted from the display panel;
    a reflection mirror configured to reflect the image light to a windshield of the vehicle;
    a phase retardance mirror spaced apart from the reflection mirror to reflect the image light forward while converting a phase of the image light, wherein the phase retardance mirror includes a rear mirror and a phase retarder disposed on a front surface of the rear mirror; and
    a polarization reflection mirror disposed between the reflection mirror and the phase retardance mirror and configured to reflect the image light passing through the polarized light plate to the phase retardance mirror, wherein the image light reflected to the phase retardance mirror is converted in phase by the phase retardance mirror and reflected by the phase retardance mirror to pass through the polarization reflection mirror.

2. The head up display according to claim 1, wherein the rear mirror comprises a flat plate mirror having a flat front surface, and a rear surface of the phase retarder is attached to the front surface of the flat plate mirror.

3. The head up display according to claim 1, wherein the phase retardance mirror has a size less than that of the polarization reflection mirror.

4. The head up display according to claim 1, wherein the polarized light plate is disposed at a lower side between the reflection mirror and the phase retardance mirror, the display panel emits the image light upward, and the phase retardance mirror and the polarization reflection mirror gradually approach each other upward.

5. The head up display according to claim 4, wherein the reflection mirror and the polarization reflection mirror are disposed in directions opposite to each other.

6. The head up display according to claim 1, wherein the polarized light plate is disposed at an upper side between the reflection mirror and the phase retardance mirror, the display panel emits the image light downward, the phase retardance mirror and the polarization reflection mirror gradually approach each other downward, and the polarization reflection mirror is disposed to be inclined in a direction a front surface of the polarization reflection mirror faces a front lower side.

7. The head up display according to claim 6, further comprising:
    a main body having an inner space;
    a top cover disposed on the main body and having an upper opening; and
    a heat dissipation device disposed at a rear side of the top cover and configured to release heat generated from the display panel.

8. The head up display according to claim 1, further comprising a holder on which the polarization reflection mirror and the phase retardance mirror are mounted.

9. The head up display according to claim 8, further comprising:
    a main body having an inner space;
    a top cover disposed on the main body and having an upper opening; and
    a window disposed in the opening,
    wherein the reflection mirror and the holder are mounted to be spaced apart from each other in the inner space.

10. The head up display according to claim 8, wherein the holder further comprises an inner holder having a rear seat groove in which the phase retardance mirror is seated and a front seat groove in which the polarization reflection mirror is seated.

11. The head up display according to claim 8, wherein the holder further comprises:
    a polarization reflection mirror cover covering a front edge of the polarization reflection mirror; and
    a phase retardance mirror cover covering a rear surface of the phase retardance mirror.

12. The head up display according to claim 11, further comprising a shield cover surrounding the phase retardance mirror cover and the polarization reflection mirror cover,
    wherein the shield cover includes a light transmission window, through which the image light is transmitted, between the polarization reflection mirror and the reflection mirror.

13. A head up display for a vehicle, the head up display comprising:
    a main body having an inner space;
    a display panel configured to emit image light;

a polarized light plate configured to linearly polarize the image light emitted from the display panel;

a reflection mirror disposed in the inner space and configured to reflect the image light to a windshield of the vehicle; and a mirror assembly spaced apart from the reflection mirror in the inner space, wherein the mirror assembly comprises:

a holder;

a phase retardance mirror spaced apart from the reflection mirror on the holder, and configured to convert the image light incident from a front side thereof to reflect the converted image line forward, wherein the phase retardance mirror includes a rear mirror and a phase retarder disposed on a front surface of the rear mirror; and a polarization reflection mirror disposed on the holder between the reflection mirror and the phase retardance mirror and configured to reflect the image light passing through the polarized light plate to the phase retardance mirror, wherein the image light reflected to the phase retardance mirror is converted in phase by the phase retardance mirror and reflected by the phase retardance mirror to pass through the polarization reflection mirror.

14. The head up display according to claim 13, wherein the holder further comprises an inner holder having a rear seat groove in which the phase retardance mirror is seated and a front seat groove in which the polarization reflection mirror is seated.

15. The head up display according to claim 13, wherein the holder further comprises:

a polarization reflection mirror cover covering a front edge of the polarization reflection mirror; and a phase retardance mirror cover covering a rear surface of the phase retardance mirror.

16. The head up display according to claim 15, further comprising a shield cover surrounding the phase retardance mirror cover and the polarization reflection mirror cover, wherein the shield cover includes a light transmission window, through which the image light is transmitted, between the polarization reflection mirror and the reflection mirror.

17. The head up display according to claim 13, wherein the rear mirror comprises a flat plate mirror having a flat front surface, and a rear surface of the phase retarder is attached to the front surface of the flat plate mirror.

18. The head up display according to claim 13, wherein the phase retardance mirror has a size less than that of the polarization reflection mirror.

19. The head up display according to claim 13, wherein the polarized light plate is disposed at a lower side between the reflection mirror and the phase retardance mirror, the display panel emits the image light upward, and the phase retardance mirror and the polarization reflection mirror gradually approach each other upward.

20. The head up display according to claim 19, wherein the reflection mirror and the polarization reflection mirror are disposed in directions opposite to each other.

* * * * *